United States Patent [19]
Bennett et al.

[11] 3,724,014
[45] Apr. 3, 1973

[54] METHOD FOR RESHAPING A SHOE LAST

[75] Inventors: Delora E. Bennett, Middleboro; Roger A. Packard, East Bridgewater, both of Mass.

[73] Assignee: Delro Engineering Corporation, Boston, Mass.

[22] Filed: Nov. 19, 1071

[21] Appl. No.: 200,422

Related U.S. Application Data

[63] Continuation of Ser. No. 883,550, Dec. 9, 1969, abandoned.

[52] U.S. Cl. .................................................12/146 L
[51] Int. Cl. ...............................................A43d 00/00
[58] Field of Search .12/146 R, 146 L, 133 R, 133 A, 12/133 B

[56] References Cited

UNITED STATES PATENTS

| 2,330,260 | 9/1943 | Baxter | 12/146 L |
| 2,394,780 | 2/1946 | Iredale | 12/146 L |
| 3,241,166 | 3/1966 | Jonas | 12/133 R |

*Primary Examiner*—Patrick D. Lawson
*Attorney*—Morse, Altman & Oates

[57] ABSTRACT

A heated thermoplastic material is applied to a shoe last which is clamped to a supporting member. A die member slidably mounted to the support is urged upon the thermoplastic material by a hydraulic actuator in consequence the thermoplastic material acquires and retains a form which is the complement of the mold cavity of the die. The die is formed with a reservoir for capture of excess thermoplastic material which is extruded when the thermoplastic material is compressed within the mold cavity.

1 Claim, 4 Drawing Figures

PATENTED APR 3 1973 3,724,014

INVENTORS
DELORA E. BENNETT
ROGER A. PACKARD
BY
Morse, Altman & Oates
ATTORNEYS

METHOD FOR RESHAPING A SHOE LAST This is a continuation of application Ser. No. 883,550, filed Dec. 9, 1969, and now abandoned.

BACKGROUND OF THE INVENTION

1. Field of the Invention

The invention relates to shoe lasts and, more particularly, to a method and apparatus for reshaping a shoe last.

2. Description of the Prior Art

Lasting of a shoe is the process during which the shoe upper and lining are made taught to a shoe last over which the shoe is made. The shoe last conforms to the style of the shoe that is desired. Since the lasting of a shoe is the most important part of the shoe fabricating process, the shoe last must conform precisely to the desired shoe style. When a shoe style is to be, changed, the shoe last is reshaped by scouring the shoe last to the new style configuration. It is well known in the art of shoe making that scouring of a shoe last is a time consumming task and requires the talents of a skilled scourer.

SUMMARY OF THE INVENTION

An object of the present invention is to provide a method and apparatus by which a shoe last may be reshaped without the talents of a skilled scourer. The apparatus is characterized by a support having a clamp affixed thereto for securing a shoe last, a die assembly slidably mounted to the support in register with that portion of the shoe last which is to be restyled, a thermoplastic material having been applied to the restyled portion of the shoe last, and means for urging the die upon the thermoplastic material. The method is characterized by the steps of applying a heated thermoplastic material to a selected section of a shoe last and molding the thermoplastic material to a desired configuration by urging a die upon the thermoplastic material. The combination of support, clamp, die assembly and urging means is such that a shoe last may be reshaped expeditiously by unskilled personnel.

The invention accordingly comprises the method steps and apparatus possessing the construction, combination of elements, and arrangement of parts that are exemplified in the foregoing disclosure, the scope of which will be indicated in the appended claims.

BRIEF DESCRIPTION OF DRAWINGS

For a fuller understanding of the nature and objects of the present invention, reference should be had to the following detailed description of the preferred embodiment depicted in the accompanying drawings wherein.

DETAILED DESCRIPTION OF THE PREFERRED EMBODIMENT

Figure 1:
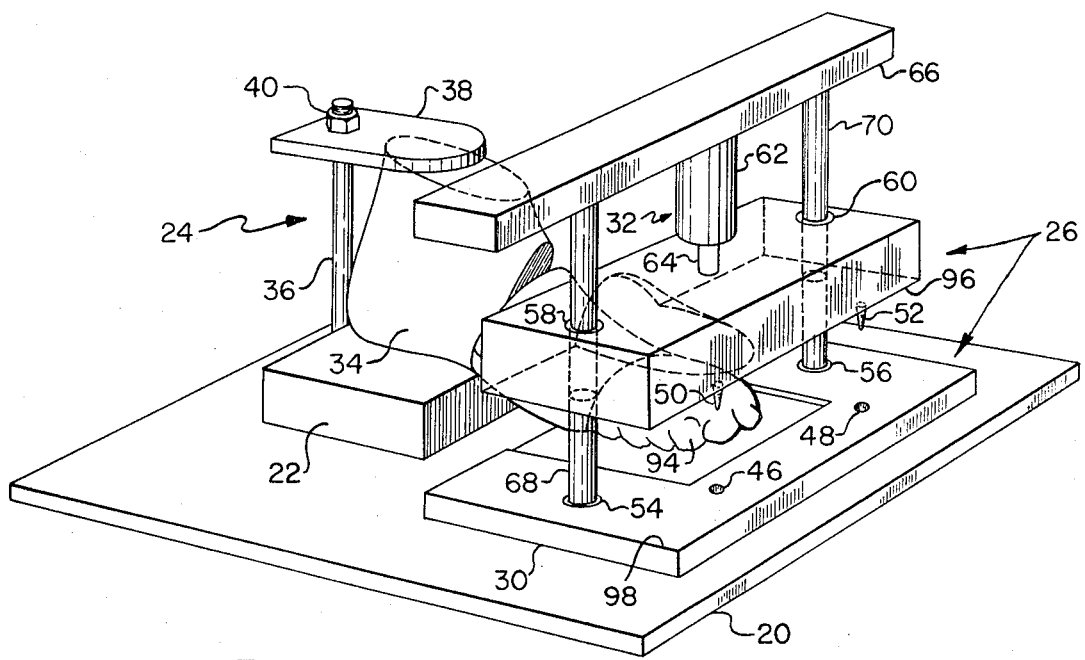
FIG. 1 is a perspective of a shoe last reshaper embodying the present invention.

Generally, the shoe last reshaper of FIG. 1 comprises a base 20 having a supporting member 22 mounted thereon, a clamping device 24 operatively connected to base 20, a die assembly 26 having an upper die member 28 slidably mounted to base 20 and a lower die member 30 securely fastened to base 20, and a urging device 32 operatively connected to base 20. In the illustrated embodiment, a shoe last 34, positioned on support 22 and lower die member 30, is to be reshaped to a configuration defined by die assembly 26.

Clamping device 24 comprises a rod 36 having one end affixed to base 20, a plate 38 adapted for reciprocal movement along the longitudinal axis of rod 36 and a fastener 40 operatively connected to rod 36 for pressing plate 38 against shoe last 34. When clamping device 24 is engaged, the vise-like action between plate 38 and base 20 secures shoe last 34 against movement.

Figures 2, 3:
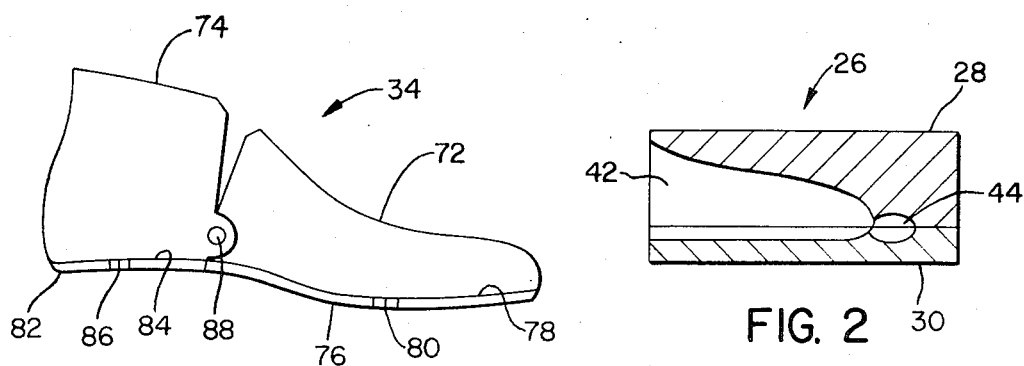
FIG. 2 is a sectional view in side elevation of the die of FIG. 1 in the closed position.
FIG. 3 is a side elevation of a typical shoe last.

In the preferred embodiment of the present invention die assembly 26 is a split casting made from a model shoe last in accordance with casting techniques well known in the art. As illustrated in FIG. 2, split casting 26 is formed with a mold cavity 42 conforming to the dimensions of the model last and an ancilliary cavity or reservoir 44. Lower die member 30 is formed with a pair of guide holes 46, 48 and upper die member 28 is provided with guide pins 50, 52; guide holes 46, 48 being adapted for reception of guide pins 50, 52, respectively. Guide holes 46, 48 are in register with guide pins 50, 52 so that the integrity of mold cavity 42 is maintained during the reshaping operation hereinafter described. Also, lower die member 30 is formed with bores 54, 56 and upper die member 28 is formed with bores 58, 60; bores 54, 56 being in register with bores 58, 60, respectively.

In the illustrated embodiment, urging device 32 is a hydraulic device which is comprised of a cylinder 62 and a piston 64. Cylinder 62 is affixed to a base plate 66 and piston 64, which is adapted for reciprocal movement within cylinder 62, is affixed to upper die member 28. A pair of shafts 68, 70 cooperatively constrain upper die member 28 and base plate 66 for reciprocal movement with respect to base 20. One end of shaft 68 is affixed to base plate 66 and the other end is affixed to base 20, the body of shaft 68 being slidably received within bores 54 and 58. One end of shaft 70 is affixed to base plate 66 and the other end is affixed to base 20, the body of shaft 70 being slidably received within bores 56 and 60. When piston 64 is extended, upper die member 28 frictionally bears on lower die member 30, guide pins 50 and 52 being received by guide holes 46 and 48, respectively. It will be appreciated that, in alternate embodiments, urging device 32 is other than a hydraulic device, for example an electrically operated jackscrew.

Generally, shoe last 34 is comprised of a toe member 72 and a heel member 74 as illustrated in FIG. 3. A plate 76, substantially conforming to the dimensional characteristics of a lower facet 78 of toe member 72, is affixed to lower facet 78 via fasteners 80. A plate 82, substantially conforming to the dimensional characteristics of a lower heel facet 84 of member 74, is affixed to lower facet 84 via fasteners 86. In order to facilitate removal of shoe last 34 from the finished shoe, member 72 is pivotally connected to member 74 via a pin 88.

By way of example, in order to facilitate an understanding of the invention, the method of reshaping a shoe last from a pointed toe style to a box toe style is described hereinafter. It will be understood that dieassembly 26 is made from a model last having a box toe style.

Figure 4:
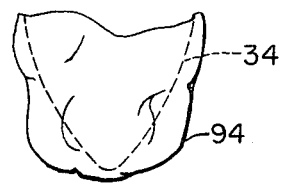
FIG. 4 is a top elevation of a shoe last having thermoplastic material applied thereon.

A heated thermoplastic material 94, preferably polyethylene, is applied to last 34 as shown in FIG. 4 and shoe last 34 is positioned on base 20, heel member 74 being supported by member 22 and toe member 72 being seated in lower die member 30. Clamping device 24 is engaged whereby last 34 is secured against movement by the vise-like action of plate 38 and member 22. Hydraulic device 32 is actuated and piston 64 is extended from cylinder 62 in consequence upper die member 28 is urged toward lower die member 30. Guide pins 50, 52 are received in guide holes 46, 48, respectively, as lower facet 96 of upper die member 28 and upper facet 98 of lower die member 30 approach each other. In consequence of the urging process, thermoplastic material 94 is compressed to the configuration defined by mold cavity 42. Excess thermoplastic material which is extruded by the compressing action of upper die member 28 and lower die member 30 is stored in reservoir 44. Upon completion of the urging operation, hydraulic device 32 is deactivated and piston 64 is retracted into cylinder 62 whereby upper die member 28 is withdrawn from lower die member 30. Clamping device 24 is disengaged and the restyled shoe last is removed from base 20.

It is to be understood that, in other examples, either heel member 74 alone or both toe member 72 and heel member 74 are restyled by the method and apparatus hereinbefore described. Although it is desired that the shoe last and thermoplastic are comprised of compatible polymers, it will be readily appreciated that the invention is applicable to shoe lasts comprised of wood, polypropylene and the like.

In the preferred embodiment, when a polyethylene shoe last is to be restyled by enlarging an existing polyethylene shoe last, plates 76 and 82 are affixed to the shoe last prior to the urging operation. Preferably, in this case, the shoe last is heated prior to application of the heated thermoplastic material. When the restyled shoe last is dimensionally smaller than an existing shoe last, the existing shoe last is undercut and the process hereinbefore described is applicable. This undercutting operation is particularly relevant for shoe last comprised of wood or polypropylene. Preferably the heated thermoplastic material is applied to cold shoe last and plates 76 and 82 are affixed after the urging operation, when a wooden or polypropylene shoe last is employed.

Since certain changes may be made in the foregoing disclosure without departing from the scope of the invention involved, it is intended that all matter contained in the above description and depicted in the accompanying drawings be construed in an illustrative and not in a limiting sense.

What is claimed is:

1. A method of reshaping a first portion of a shoe last, comprising the steps of:
   a. first, fabricating an open-ended, split casting from a first portion of a model shoe last, said casting having separable upper and lower die members, said casting formed with first and second interconnected cavities, said first cavity conforming to the dimensions of said first portion of said model shoe last, said second cavity defining a reservoir;
   b. second, positioning said upper and lower die members on a shoe last reshaper having a base portion and a support portion, said lower die member mounted to said base portion;
   c. third, cooperatively constraining said upper die member and said base portion reciprocal movement of said upper die member with respect to said base in registration with said lower die member;
   d. fourth, heating a thermoplastic material;
   e. fifth, applying the heated thermoplastic material to said first portion of said shoe last to be reshaped being unheated;
   f. sixth, positioning said shoe last to be reshaped on said shoe last reshaper, said first portion of said shoe last to be reshaped and said heated thermoplastic material being received within said lower die member, a second portion of said shoe last to be reshaped being received by said supporting portion of said shoe last reshaper, said first and second portions of said shoe last to be reshaped pivotally connected;
   g. seventh, clamping said second portion of said shoe last to be reshaped to said supporting portion of said shoe last reshaper;
   h. eighth, sealing the open end of said first cavity about said unheated first portion of said shoe last to be reshaped by urging said upper die member against said lower die member;
   i. ninth, extruding said heated thermoplastic material within said first cavity into said second cavity; and
   j. tenth, molding said heated thermoplastic material into a form defined by said first cavity.

* * * * *